(12) United States Patent
Kunisada et al.

(10) Patent No.: US 8,010,278 B2
(45) Date of Patent: Aug. 30, 2011

(54) CONTROL APPARATUS FOR INTERNAL COMBUSTION ENGINE

(75) Inventors: Shinji Kunisada, Kobe (JP); Yasushi Takemoto, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 291 days.

(21) Appl. No.: 12/437,958

(22) Filed: May 8, 2009

(65) Prior Publication Data

US 2010/0122695 A1    May 20, 2010

(30) Foreign Application Priority Data

Nov. 17, 2008    (JP) ................................. 2008-293348

(51) Int. Cl.
*F02D 41/00* (2006.01)
*B60T 7/12* (2006.01)
(52) U.S. Cl. .......... 701/114; 123/1 A; 123/674; 701/109
(58) Field of Classification Search .................. 123/1 A, 123/575, 674, 494; 701/109, 114
See application file for complete search history.

(56) References Cited

U.S. PATENT DOCUMENTS

| | | | | |
|---|---|---|---|---|
| 6,714,856 B2* | 3/2004 | Huff et al. | ...................... | 701/114 |
| 6,928,998 B2* | 8/2005 | Abe | ............................... | 123/674 |
| 6,975,933 B2* | 12/2005 | Abe et al. | ...................... | 701/109 |
| 6,997,172 B2* | 2/2006 | Oshimi et al. | ................ | 123/685 |
| 7,209,826 B2* | 4/2007 | Abe et al. | ...................... | 701/109 |
| 7,650,874 B2* | 1/2010 | Takubo | ......................... | 123/434 |
| 7,685,995 B2* | 3/2010 | Nonoyama | .............. | 123/406.31 |
| 7,729,846 B2* | 6/2010 | Kitada et al. | ................... | 701/107 |
| 7,778,764 B2* | 8/2010 | Ito et al. | ....................... | 701/104 |
| 7,856,307 B2* | 12/2010 | Ito et al. | ........................ | 701/109 |
| 7,908,073 B2* | 3/2011 | Takubo | ........................ | 701/103 |
| 2004/0162667 A1* | 8/2004 | Abe et al. | ...................... | 701/109 |
| 2010/0242935 A1* | 9/2010 | Takubo | ......................... | 123/703 |

FOREIGN PATENT DOCUMENTS

JP            5-60003 A       3/1993
JP        2004-285971 A      10/2004

* cited by examiner

*Primary Examiner* — Thomas N Moulis
(74) *Attorney, Agent, or Firm* — Sughrue Mion, PLLC

(57) ABSTRACT

An engine is operated with air-fuel ratio F/B control interrupted, by regarding an alcohol concentration value ALC1 inputted from outside as a tentative concentration value, and by detecting the rotation-speed fluctuation amount of an engine, the appropriateness of the tentative concentration value is determined. In the case where it is determined that the tentative concentration value is appropriate, an estimated alcohol concentration value ALC2 stored in a storage means is replaced by the tentatively changed alcohol concentration value ALC1.

5 Claims, 6 Drawing Sheets

CONTROL APPARATUS FOR INTERNAL COMBUSTION ENGINE

BACKGROUND OF THE INVENTION

1. Field of the Invention

The present invention relates to a control apparatus for an internal combustion engine and more particularly to a control apparatus, for an internal combustion engine, that is provided with a function capable of appropriately estimating and updating the concentration of alcohol in a fuel for the internal combustion engine that utilizes an alcohol-containing fuel.

2. Description of the Related Art

There exists an automobile that is referred to as a so-called flexible fuel vehicle (referred to as FFV, hereinafter), which can travel with a mixed fuel composed of alcohol and gasoline at various ratios, in addition to gasoline. Alcohol is different from normal gasoline (mixed fuel) in the amount of contained carbon atoms; therefore, in supplying a mixed fuel composed of alcohol and gasoline to an internal combustion engine utilized in an FFV, it is required to adjust the fuel injection amount, in accordance with the alcohol concentration value of the fuel.

Accordingly, among such FFVs, there have been known a control apparatus in which the alcohol concentration value of a fuel is detected by an alcohol concentration sensor disposed in the fuel tank and a control apparatus in which an alcohol concentration is estimated through the correlation between the alcohol concentration value and the average value of air-fuel ratio feedback correction coefficients that are calculated based on the air-fuel ratio in exhaust gasses. Moreover, as disclosed in Japanese Patent Application Laid-Open No. H9-60003 and Japanese Patent Application Laid-Open No. 2004-285971, there have been known control apparatuses that prevent the drivability (driving performance) and the exhaust gas performance from being impaired even in the case where the alcohol concentration sensor is abnormal.

That is to say, Japanese Patent Application Laid-Open No. H5-60003 proposes a method in which, in the case where an abnormality occurs in an alcohol concentration sensor, by forcibly giving an arbitrary concentration value before feedback control is started and detecting the optimum driving condition based on the value of change in the engine rotation speed, the optimum concentration value is estimated before feedback is started even in the case where an abnormality occurs in the alcohol concentration sensor.

Additionally, Japanese Patent Application Laid-Open No. 2004-285971 proposes a method in which, in the case where the control apparatus for an engine is replaced, by utilizing a first fuel property representative value given from the outside and estimating/updating the alcohol concentration value, there is prevented deterioration in the movement performance of the internal combustion engine such as being unstartable or deterioration in the exhaust gas performance.

However, in the case of Japanese Patent Application Laid-Open No. H5-60003, when, during concentration estimation before the feedback control (while the loop is opened), the feedback control is established, the foregoing concentration estimation is interrupted and feedback-controlled concentration estimation is started. In this situation, in the case where the feedback control is out of order, e.g., an abnormality exists in the feedback system, the open-loop concentration estimation is not completed and the feedback-controlled concentration estimation is not correctly performed, whereby an erroneous alcohol concentration value is estimated/updated; as a result, there has been a problem that, during open-loop driving, the drivability (driving performance) and the exhaust-gas performance of the vehicle are adversely affected.

Moreover, also in the case of Japanese Patent Application Laid-Open No. 2004-285971, there has been a problem that, in the case where an alcohol concentration value is updated during the feedback control and an abnormality exists in the feedback system, an erroneous alcohol concentration value is estimated/updated, as is the case with Japanese Patent Application Laid-Open No. H5-60003. Still moreover, because, as a control value, an alcohol concentration value is updated and utilized based on a value given from the outside, there has been a problem that, when being erroneously updated, the alcohol concentration value cannot be restored. In other words, in the case where, because there actually exists no problem in an unupdated alcohol concentration value, e.g., there exists a problem in an item, other than the alcohol concentration value, such as a device, e.g., an injector or an ignition system, the driving condition of the vehicle does not become optimum even through the alcohol concentration value is updated, there has been a problem that, because the alcohol concentration value cannot be restored, solving of the problem with regard to the vehicle drivability is hindered.

SUMMARY OF THE INVENTION

The present invention has been implemented in order to solve the foregoing problems; the objective thereof is to provide a control apparatus, for an internal combustion engine, that can securely estimate an optimum open-loop alcohol concentration value even in the case where the feedback control system is out of order and can prevent the driving performance and the exhaust gas performance from being deteriorated.

Another objective thereof is to provide a control apparatus, for an internal combustion engine, in which, even though being updated to an erroneous value, the alcohol concentration value can be restored to the latest unupdated value in the case where the update of the alcohol concentration value is not required so that a problem in a portion of the engine other than the fuel system can rapidly be solved.

A control apparatus for an internal combustion engine according to the present invention is provided with an alcohol concentration estimation means that estimates an alcohol concentration value ALC2 for the engine that utilizes an alcohol-containing fuel; a storage means that stores the alcohol concentration value ALC2 estimated by the alcohol concentration estimation means; an alcohol concentration feeding means that forcibly and tentatively changes an alcohol concentration value; a feedback interruption means that interrupts feedback control in engine control when the alcohol concentration feeding means forcibly and tentatively changes an alcohol concentration value; a determination means that determines whether or not to replace the estimated alcohol concentration value ALC2 stored in the storage means by the tentatively changed alcohol concentration value ALC1; and an update means that replaces the alcohol concentration value ALC2 stored in the storage means by the tentatively changed alcohol concentration value ALC1, when the determination means determines to implement the replacement.

The control apparatus for an internal combustion engine further includes a restoration means that restores the alcohol concentration value ALC2 estimated by the alcohol concentration estimation means to an immediately previous concentration value thereof that has not been replaced tentatively, when the determination means determines not to replace the alcohol concentration value ALC2 by the tentatively changed alcohol concentration value ALC1.

In a control apparatus for an internal combustion engine according to the present invention, feedback control is interrupted while the alcohol concentration value is tentatively changed, whereby transition to the feedback control does not occur; therefore, because there can be prevented the state in which open-loop alcohol concentration estimation is not completed, the optimum open-loop alcohol concentration value can securely be estimated.

Still moreover, in the case where it is determined that the operation state of an engine operated through a tentatively changed alcohol concentration value is optimum, by replacing an already stored alcohol concentration value by the tentatively changed alcohol concentration value, an appropriate alcohol concentration is reflected in a control value, so that the open-loop driving performance and exhaust gas performance can securely be prevented from being deteriorated.

Furthermore, when not required to be rewritten, the alcohol concentration value can be restored to an unupdated alcohol concentration value; thus, there can be obtained a control apparatus for an internal combustion engine capable of rapidly solving a problem in a portion of the engine other than the fuel system.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
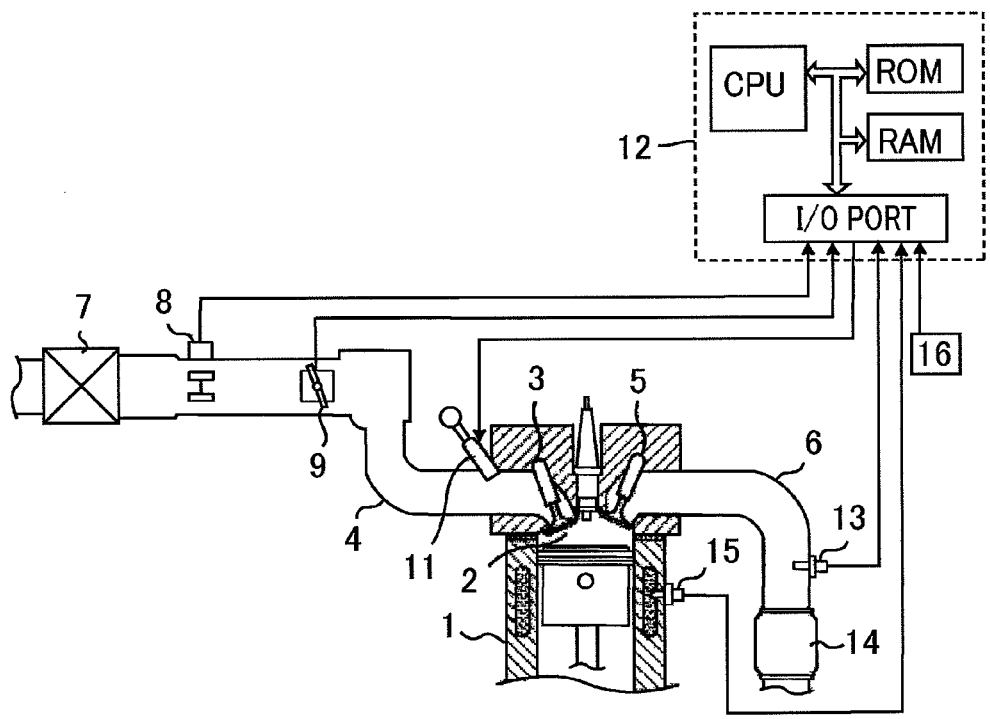
FIG. 1 is a schematic configuration diagram of a control apparatus for an internal combustion engine according to Embodiment 1 of the present invention.

FIG. 1 is a schematic configuration diagram of a control apparatus for an internal combustion engine according to Embodiment 1 of the present invention; the internal combustion engine illustrated in FIG. 1 utilizes a fuel including alcohol and is mounted in a vehicle.

In FIG. 1, an air-intake path 4 is connected via an air-intake valve 3 with a combustion chamber 2 of an engine main body 1, and an exhaust path 6 is connected with the combustion chamber 2 via an exhaust valve 5. An air cleaner 7, an air flow meter 8 that detects an air-intake amount, a throttle valve 9 that controls an air-intake amount, and a fuel injection valve 11 that performs injecting supply of fuel while air is taken in are arranged in the air-intake path 4.

Based on an injection command signal from an engine control unit (referred to as ECU, hereinafter) 12, the fuel injection valve 11 injects and supplies fuel into taken air in accordance with the driving condition, in such a way that a predetermined air-fuel ratio is realized. In the exhaust path 6, there are arranged a three-way catalyst 14 and an oxygen concentration sensor 13 as an air-fuel ratio detection means that makes it possible to calculate an air-fuel ratio in exhaust gases by detecting the oxygen concentration in the exhaust gases.

The three-way catalyst 14 can concurrently purify NOx, HC, and CO in exhaust gases in the case where the air-fuel ratio falls within a so-called window whose center is the theoretical air-fuel ratio. Accordingly, in ECU 12, feedback (described as F/B, hereinafter) control of the air-fuel ratio in exhaust gasses is performed based on the output from the oxygen concentration sensor 13 provided at the upstream side of the three-way catalyst 14, in such a way that the air-fuel ratio in exhaust gasses varies within the window.

Additionally, ECU 12 receives a signal from a water temperature sensor 15 that detects the temperature of coolant water for the engine main body 1, and it is made possible to input to ECU 12 a signal from an alcohol concentration input device 16 (the detail thereof will be described later) as an alcohol concentration feeding means.

A fuel including alcohol is different from normal gasoline in the amount of contained C (carbon) atoms; thus, in order to gain the same equivalence ratio, a large amount of injection is required. As a result, in the case where a mixed fuel composed of alcohol and gasoline is supplied to the engine, it is required to adjust the fuel injection amount in accordance with the alcohol concentration value of the fuel.

Next, the alcohol concentration input device 16 as an alcohol concentration feeding means will be described in detail. In Embodiment 1, the alcohol concentration input device 16, which consists mainly of a variable resistor, is connected with an dedicated analogue input terminal of ECU 12; it is assumed that the input voltage (described as VALC, hereinafter) fed to the dedicated analogue input terminal is adjusted, based on a predetermined trigger, e.g., manipulation of an adjustment knob disposed in an instrument panel.

In the case where, during replacement, or inspection and maintenance of ECU 12, the alcohol concentration estimation value of the fuel stored in ECU 12 is initialized, the alcohol concentration estimation value given as an initial value is usually a single fixed value (corresponding to, for example, the value of gasoline including no alcohol); therefore, the initial value does not necessarily coincide with the alcohol concentration value of the fuel that is currently in the fuel tank.

Moreover, also in the case where, because F/B control is not correctly performed due to a defect in a device, in the feedback system, such as the oxygen concentration sensor 13, the alcohol concentration estimation value (described as ALC2, hereinafter), obtained through F/B control, is erroneously estimated, the initial value may not coincide with the alcohol concentration value of the fuel that is currently in the fuel tank.

In ECU 12, based on the alcohol concentration estimation value, there are performed, for example, correction of an fuel injection amount in the fuel control and correction of an ignition timing in the ignition timing control; therefore, because, in the foregoing cases, the correction value does not coincide with the actual alcohol concentration value, fuel control may cause a failure in the engine of an vehicle. Accordingly, while F/B control is interrupted, the input voltage VALC is inputted from the alcohol concentration input device 16 to ECU 12, and the alcohol concentration value (described as ALC3, hereinafter) that is utilized for actual control is set to a tentative alcohol concentration value ALC1 (the detail thereof will be described later) calculated based on the VALC, so that the alcohol concentration estimation value in ECU 12 can be controlled to be an optimum value.

Figure 2:
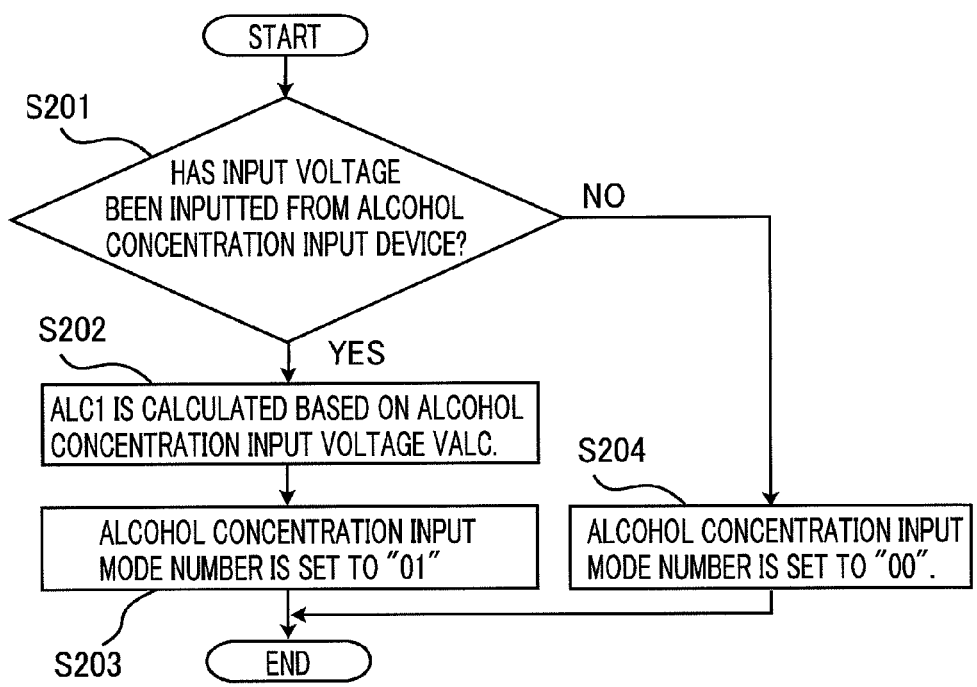
FIG. 2 is a flowchart representing a flow of control, according to Embodiment 1 of the present invention, in which an inbound alcohol concentration is determined.
Figure 3:
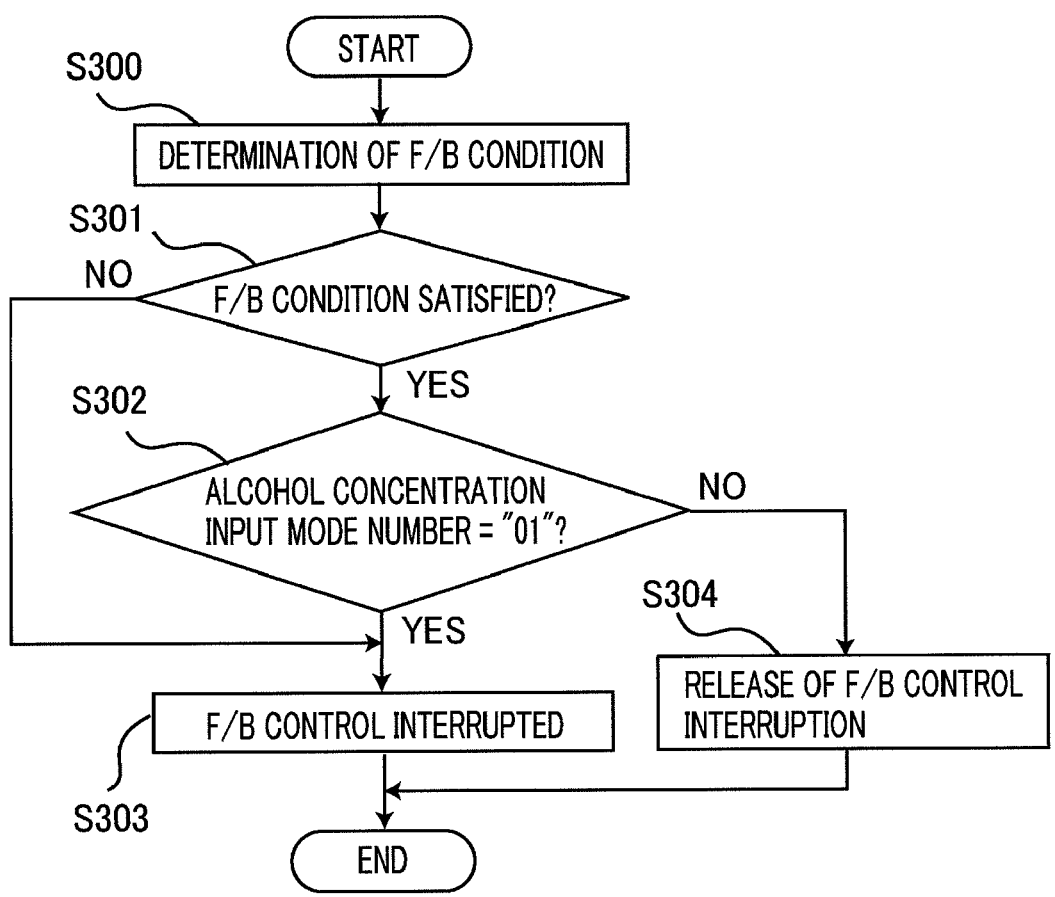
FIG. 3 is a flowchart representing a flow of control, according to Embodiment 1 of the present invention, in which air-fuel ratio feedback (F/B) control is stopped.
Figure 4:
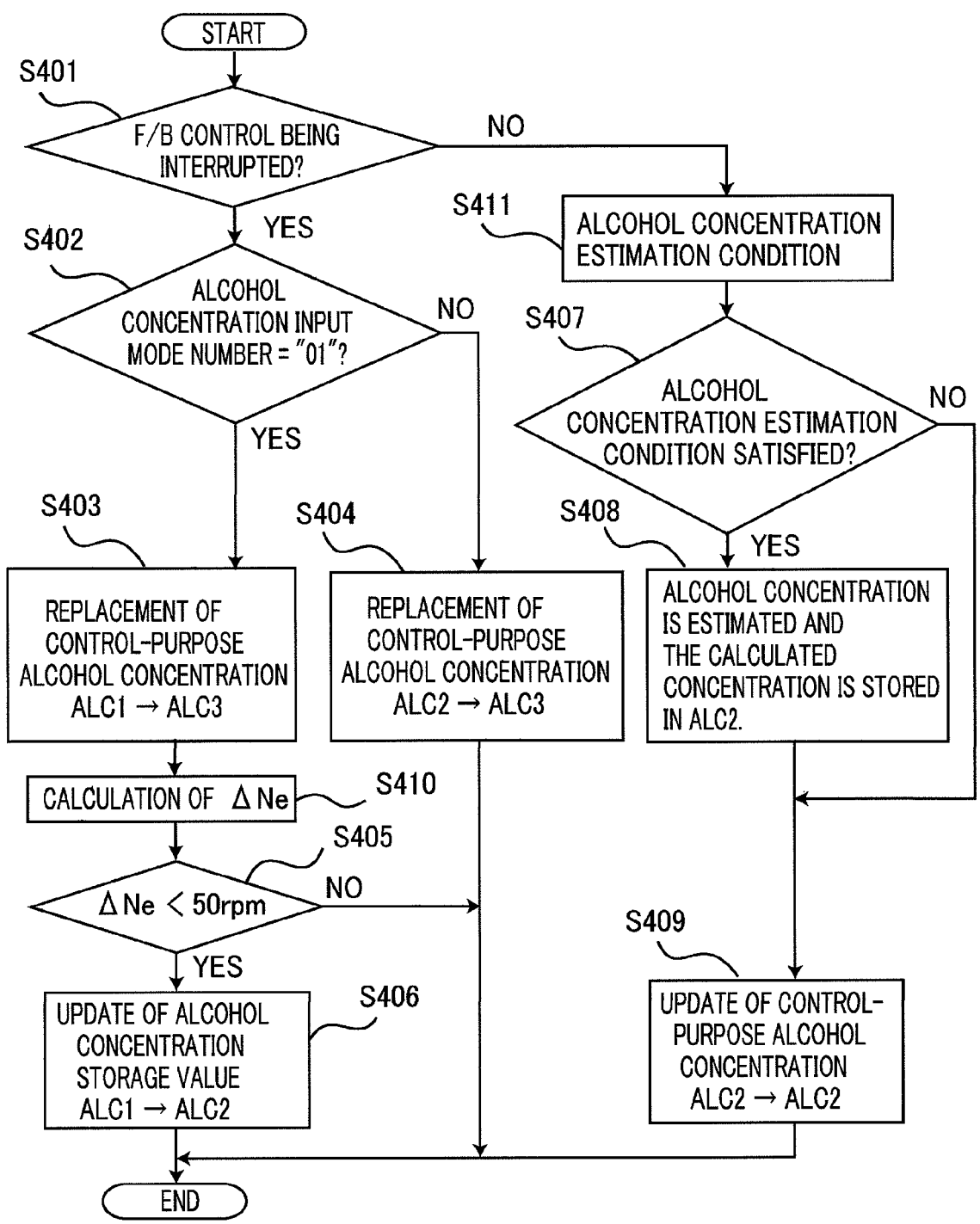
FIG. 4 is a flowchart representing a flow of control, according to Embodiment 1 of the present invention, in which it is determined whether or not an alcohol concentration value estimated through F/B control is replaced by an inbound alcohol concentration is determined.

Here, the actual processing in ECU 12 of a control apparatus, for an internal combustion engine, according to Embodiment 1 will be explained with reference to flowcharts in FIGS. 2 to 4. FIGS. 2 to 4 are a set of flowcharts in which there is represented a process from the routine for determining the input from the alcohol concentration input device 16, which is a means for feeding (updating) an alcohol concentration value from the outside, to the update of the alcohol concentration value during interruption of F/B control; the process is recurrently carried out while ECU 12 operates.

FIG. 2 is a routine in which it is determined whether or not an input voltage is inputted from the alcohol concentration input device 16 to the dedicated analogue input terminal of ECU 12. In the input determination routine represented in FIG. 2, ECU 12 firstly determines in the step S201 whether or not the input voltage VALC has been inputted from the alcohol concentration input device 16. In the case where it is determined that the input voltage VALC has not been inputted, the alcohol concentration input mode is set to "00" in the step S204, and then the routine in FIG. 2 is ended.

Here, the following method makes it possible to determine whether or not the input voltage VALC has been inputted. For example, in the case where the input voltage VALC is 0 (V) or in the case where the input voltage VALC is a predetermined threshold value or smaller, it is determined that the input voltage VALC has not been inputted from the alcohol concentration input device 16 to the dedicated analogue input terminal of ECU 12; in the case where the input voltage VALC is larger than 0 (V) or in the case where the input voltage VALC is a predetermined threshold value or larger, it is determined that the input voltage VALC has been inputted from the alcohol concentration input device 16 to the dedicated analogue input terminal of ECU 12.

Figure 5:
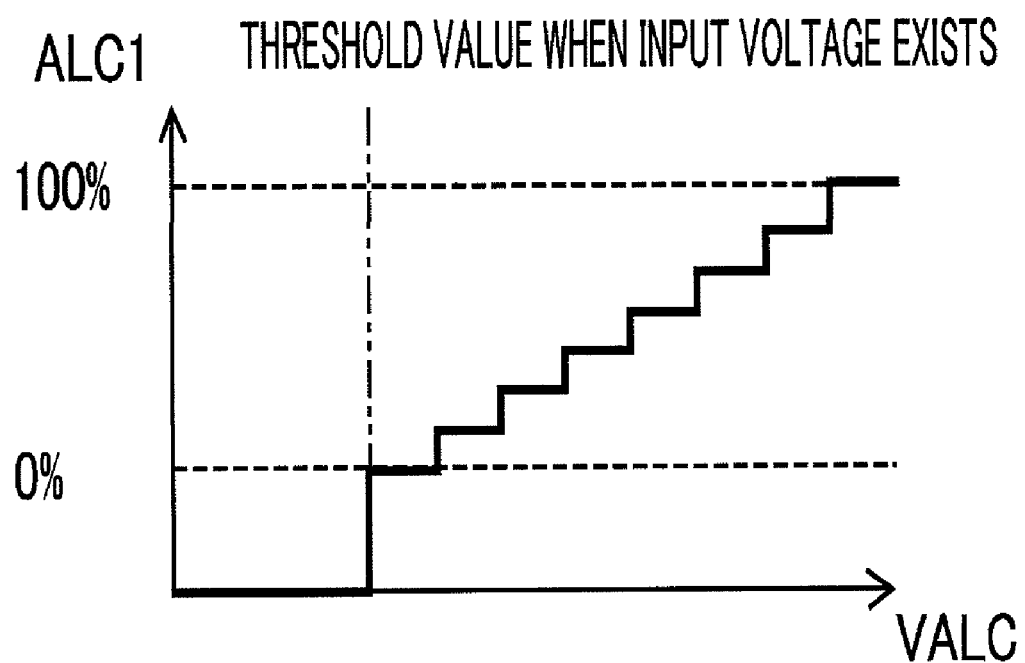
FIG. 5 is a graph representing an example of map, according to Embodiment 1 of the present invention, of alcohol concentration ALC1 vs. input voltage VALC.

In the case where it is determined that the input voltage VALC has been inputted from the alcohol concentration input device 16, the step S201 is followed by the step S202, where the alcohol concentration ALC1 is calculated. Here, in the step S202, the alcohol concentration ALC1 is calculated based on a map of the alcohol concentration value ALC1 vs. the input voltage VALC set in a ROM incorporated in ECU 12, as represented in FIG. 5.

After that, the step 202 is followed by the step S203, where the alcohol concentration input mode is set to "01", and then the routine in FIG. 2 is ended.

FIG. 3 represents a routine for a determination whether or not to interrupt F/B control. The routine, represented in FIG. 3, for a determination whether or not to interrupt F/B control is implemented after the routine represented in FIG. 2 has been completed.

Firstly, in the step S300, an F/B control condition is determined. In the stet S300, it is determined whether or not a predetermined F/B control condition is satisfied, by detecting, for example, that the water temperature detected by the water temperature sensor 15 is higher than a predetermined value, that a sufficient time has elapsed after the engine started, that the opening level of the throttle valve 9 is lower than a predetermined value, and that the air amount detected by the air flow meter 8 is within a predetermined range.

Next, in the case where, in the step S301, it is determined that the F/B control condition, determined in the step S300, is not satisfied, the step S301 is followed by the step S303, where the F/B control is interrupted, and then the routine represented in FIG. 3 is ended.

In the case where it is determined that the F/B control condition is satisfied, the step S301 is followed by the step S302, where the alcohol concentration input mode is determined. In the case where the alcohol concentration input mode is "01", the step S302 is followed by the step S303, as is the case where the F/B control condition is not satisfied; after that, the F/B control is interrupted, and then the routine represented in FIG. 3 is ended.

In the case where, in the step S302, the alcohol concentration input mode is not "01", the step S302 is followed by the step S304, where the interruption of F/B control is released, and then the routine represented in FIG. 3 is ended.

That is to say, in the case where, in FIG. 2, it is determined that the alcohol concentration input mode is "01", the F/B control is forcibly interrupted even in the case where the F/B control condition has been satisfied in the routine, represented in FIG. 3, for a determination whether or not to interrupt F/B control.

FIG. 4 represents a routine in which it is determined whether or not the alcohol concentration value ALC2, estimated through the F/B control and stored in ECU 12, is replaced by a tentatively given alcohol concentration value ALC1. The routine represented in FIG. 4 is implemented after the routine, represented in FIG. 3, for a determination whether or not to interrupt F/B control has been completed.

In the step 401, it is determined whether or not the F/B control is being interrupted; in the case where the F/B control is being implemented, the step S401 is followed by the step S411, where alcohol concentration determination processing is implemented through F/B control. In the case where the F/B control is not being implemented, the step S401 is followed by the step S402.

In the step S402, it is determined whether or not the alcohol concentration input mode is "01"; in the case where the alcohol concentration input mode is "01", the step S402 is followed by the step S403, where the control-purpose alcohol concentration value ALC3 is temporally replaced by a tentative alcohol concentration value ALC1, and then the step S403 is followed by the step S410.

In the step S410, a rotation fluctuation amount ΔNe is calculated. In Embodiment 1, in order to determine whether or not the engine is stably operated, the rotation fluctuation amount ΔNe is obtained by calculating the difference between the maximum engine rotation speed and the minimum engine rotation speed in steps of a predetermined time period Tsec since the control-purpose alcohol concentration value ALC3 has been replaced by the tentative alcohol concentration value ALC1 in the step S403. After the rotation fluctuation amount ΔNe is calculated in the step S410, the step S410 is followed by the step S405. In this situation, as the predetermined time period Tsec, there may be set a time in which it can be confirmed that, after the control-purpose alcohol concentration value ALC3 is replaced by the tentative alcohol concentration value ALC1, the replacement has sufficiently been reflected in the fuel control and the ignition control.

In the step S405, it is determined whether or not the rotation fluctuation amount ΔNe is smaller than a value, e.g., 50 rpm, with which it can be determined that the engine is being operated stably; in the case where it is determined that the rotation fluctuation amount ΔNe is smaller than the value, the step S405 is followed by the step S406, where the alcohol concentration value ALC2, estimated through the F/B control and stored in ECU 12, is replaced by a tentative alcohol concentration value ALC1, and then the processing in the forgoing routine is ended. In the case where it is determined that the rotation fluctuation amount ΔNe is not smaller than the value, the processing in the forgoing routine is ended without updating ALC2.

In contrast, in the case where, in the step S402, it is determined that the alcohol concentration input mode is "00", the step 402 is followed by the step S404, where the control-purpose alcohol concentration value ALC3 is set to the estimated value ALC2, and then the routine represented in FIG. 4 is ended.

Here, with reference to the time chart represented in FIG. 6, there will be explained the estimation of an alcohol concentration during the interruption of the F/B control.

Figure 6:
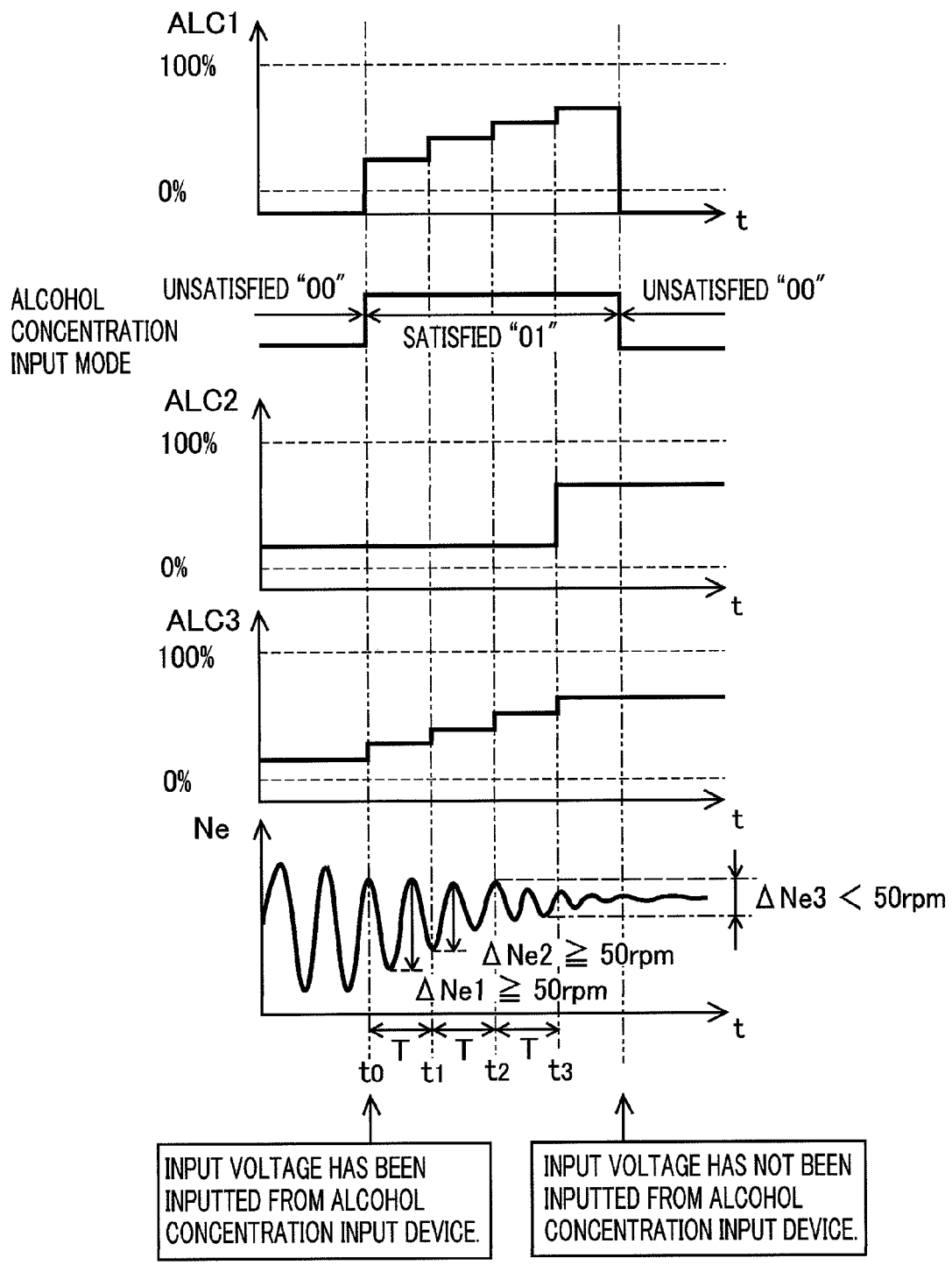
FIG. 6 is a time chart representing estimation, according to Embodiment 1 of the present invention, of alcohol concentration performed while F/B control is stopped.

In FIG. 6, until the time instant t0, the input voltage VALC has not been inputted from the alcohol concentration input device 16; as the alcohol concentration, the estimation value ALC2 is stored, and as the control-purpose alcohol concentration value ALC3, a value that is the same as ALC2 is stored.

Under the foregoing circumstances, until the time instant t0 in FIG. 6, the rotation fluctuation amount ΔNe of the engine rotation speed Ne is large, whereby the engine is out of order. In other words, because both ALC2 and ALC3 are far from the actual alcohol concentration, the respective correction values, obtained through alcohol concentrations, in the fuel control and the ignition control are not appropriate values; therefore, a failure may exist in the engine.

In this situation, when, at the time instant t0, the input voltage is inputted from the alcohol concentration input device 16, it is determined in the determination represented in FIG. 2 that the alcohol concentration input mode is "01", and then a value is set as ALC1; as a result, in the determination routine represented in FIG. 3, the F/B control is interrupted.

Because, at the time instant t0, the alcohol concentration input mode becomes "01", the concentration value ALC3 is tentatively replaced by ALC1 through the determination in the step S402 in FIG. 4 and the processing in the step S403. In this situation, because ALC3 is replaced by ALC1 while ALC2 holds the same state as it had before the time instant t0, the value of ALC1 is reflected in the control-purpose alcohol concentration.

In a predetermined time period Tsec between the time instants t1 and t1, the alcohol concentration varies in accordance with the operation of the alcohol concentration input device 16; when the alcohol concentration approaches the actual alcohol concentration, the fluctuation amount of the engine rotation gradually decreases from the time instant t0. However, when, in the predetermined time period between t0 and t1, the difference ΔNe1, of the rotation fluctuation amount, between the maximum engine rotation speed and the minimum engine rotation speed is larger than 50 rpm, the determination in the step S405 in FIG. 4 does not lead to the replacement of ALC2 at the time instant t1.

By further repeating the operation of the alcohol concentration input device 16 so as to change the alcohol concentration, the rotation fluctuation amount of the engine is gradually reduced; however, in the predetermined time period Tsec between t1 and t2 in FIG. 6, the difference ΔNe2 of the rotation fluctuation amount is still larger that 50 rpm; therefore, as is the case of the time period between t0 and t1, the value of ALC2 is not replaced at the time instant t2 but is held as it is.

The operation of the alcohol concentration input device 16 is continued so as to change the alcohol concentration until the rotation fluctuation amount of the engine becomes small; as a result, the difference ΔNe3 of the rotation fluctuation amount in the predetermined time period Tsec between t2 and t3 becomes smaller than 50 rpm.

Accordingly, at the time instant t3, it is determined in the step S405 in FIG. 4 that the rotation fluctuation amount of the engine is 50 rpm or smaller, and then the value of ALC2 is replaced by the value of ALC1, as an appropriate value.

That is to say, in the step S405, it is determined through the rotation fluctuation amount ΔNe whether or not the engine is stably operated with the alcohol concentration value ALC1, which is a tentative replacement; in the case where the rotation fluctuation amount ΔNe is small, it is determined that the tentatively given alcohol concentration value ALC1 is reflected, as an appropriate value, in the control, and in the step S406, ALC2 is replaced by ALC1. In contrast, in the case where the rotation fluctuation amount ΔNe is large, it is suggested in the step S405 that the engine is not stably operated with the alcohol concentration value ALC1, which is a tentative replacement; therefore, ALC2 is kept unupdated.

Next, in the case where, in the step S401, it is determined that the F/B control is being implemented, the step S401 is followed by the step S411, where it is determined whether or not the alcohol concentration estimation condition has been satisfied.

The alcohol concentration estimation condition is determined through the fuel consumption amount after the start of the engine. It suggests that the alcohol concentration is estimated after the respective alcohol concentrations of the fuel within the fuel tank and the fuel that is injected from the fuel injection valve become equal to each other, i.e., after the fuel within the pipeline that connects the fuel tank and the fuel injection valve is consumed.

In the case where, in the step S407, the alcohol concentration estimation condition has been satisfied in the step S407, the alcohol concentration estimation value is calculated and ALC2 is updated in the step S408; then, the step S408 is followed by the step S409.

Here, there will be explained a method for calculation, performed in the step S408, of the alcohol concentration estimation value. The theoretical air-fuel ratio (e.g., 8.9 in the case of pure ethanol) of an alcohol fuel is smaller than the theoretical air-fuel ratio (e.g., 14.7) of gasoline; therefore, in the case where an alcohol fuel is utilized and fuel injection control is performed under the same condition as gasoline is utilized, the fuel injection amount becomes insufficient. Accordingly, by changing a correction coefficient α through the F/B control, the fuel injection amount is adjusted. Because the change in the alcohol concentration is reflected in the change of the correction coefficient α for the F/B control, the alcohol concentration can be calculated by use of the following means, through the F/B correction coefficient α.

With regard to calculation of the alcohol concentration estimation value, firstly, the maximum vale αmax and the minimum value αmin of the F/B correction coefficient α are read while the F/B control is being performed, and based on Equation (1) below, the average value between αmax and αmin, i.e., the average value αave of the F/B correction coefficient α is calculated.

$$\alpha ave = (\alpha max + \alpha min)/2 \quad (1)$$

After that, based on Equation (2) below, there is calculated the difference ΔM between the average αave and the reference value 1.0 which suggests that the correction through the F/B correction coefficient α is not actually performed.

$$\Delta M = \alpha ave - 1.0 \quad (2)$$

After that, the alcohol concentration is calculated based on a preliminarily set map having an axis of the difference ΔM. In this situation, the larger the difference ΔM is (the leaner the basic air-fuel ratio is), the larger alcohol concentration is calculated.

In the case where the alcohol concentration estimation condition has not been satisfied, ALC2 is kept to be the latest estimation value, and then the step S408 is followed by the step S409. In this situation, as the latest value of ALC2, the alcohol concentration initial value (0%) has been set, as described above, in the case where the alcohol concentration has never been estimated; in other cases, there has been held a value obtained though update implemented in the step S408 when the alcohol concentration estimation condition has most recently been satisfied or a value obtained through replacement implemented in the step S406. In the step S409, in the case where calculation has been performed in the step S408, the updated alcohol concentration estimation value is stored as the control-purpose alcohol concentration value ALC3, and in the case where update has not been performed in the step S408, the alcohol concentration storage value ALC2, which has most recently been updated, is stored as the control-purpose alcohol concentration value ALC3; after that, the routine in FIG. 4 is ended.

As described above, in the case where the alcohol concentration input mode is "01", the F/B control is forcibly interrupted in the step S303 in accordance with the determination in the step S302 in FIG. 3, so that, even in the case where the F/B system is out of order and hence a conventional control apparatus might have erroneously estimated the alcohol concentration through F/B control, the alcohol concentration can be updated without being affected by the abnormality of the F/B system.

Furthermore, in this situation, the control-purpose alcohol concentration value ALC3 is tentatively replaced by ALC1 in the step S403 in FIG. 4, and in the step S405, it is determined through the rotation fluctuation amount ΔNe whether or not the replacement can be performed; in the case where it is determined that the replacement can be performed, ALC2 is replaced by ALC1, so that ALC2 can be updated by an appropriate value.

Each time it is determined in the step S405 that the replacement cannot be performed, ALC2 is not replaced. In this situation, in the case where the alcohol concentration input mode becomes "00" in the routine in FIG. 2, it is determined in the step S402 that the alcohol concentration input mode is "00", and ALC2 is reflected in ALC3.

In other words, even in the case where the control-purpose alcohol concentration value ALC3 has tentatively been replaced by ALC1, ALC2 has not been updated; therefore, in the case where, in the step S405, it is determined through the rotation fluctuation amount ΔNe that the replacement cannot be performed, ALC3 is also restored to the alcohol concentration, which is an alcohol concentration before the tentative replacement.

Accordingly, when, no matter which value the tentatively replaced alcohol concentration value ALC1 is set to, the engine is not stably operated, the alcohol concentration ALC1 cannot be set to an appropriate value; therefore, because it is conceivable that the problem exists not in the alcohol concentration but in a device such as an injector or in an ignition system, ALC2 is not updated but restored to ALC3. Accordingly, even in the case where, after ALC3 is replaced by the value of ALC1, the engine is operated, ALC3 can be restored to the alcohol concentration value, which has not tentatively replaced; thus, the solution of the problem in the vehicle drivability in the case where no problem exists in the alcohol concentration value can be prevented from being hindered.

Embodiment 2

In Embodiment 1 described above, the alcohol concentration input device 16 has been explained as an input voltage adjustment means that is connected with the dedicated analogue input terminal of ECU 12. Next, as Embodiment 2, there will be explained an alcohol concentration replacement method for a case where the alcohol concentration input device 16 is a vehicle diagnosis tester having a communication function.

In general, a failure-diagnosis communication line is equipped in a vehicle; by connecting a failure diagnosis tester (unillustrated) to a connection-purpose standard connecter (unillustrated), ECU 12 in the vehicle, a transmission control ECU (unillustrated), and a suspension control ECU (unillustrated) are connected with a failure diagnosis tester through the failure-diagnosis communication line; these ECUs are capable of receiving and transmitting data by communicating with the failure diagnosis tester.

In Embodiment 2, because being a vehicle diagnosis tester, the alcohol concentration input device 16 is not required to be connected when a vehicle is normally driven; the alcohol concentration input device 16 is connected only when required for maintenance or the like.

In general, a tester has a function of obtaining, through communication, control information in the inside of an in-vehicle ECU, a function of transmitting information therefrom, a function of transmitting to an ECU a command for forcibly operating the actuator of the vehicle, and the like; similarly, in Embodiment 2, a tester has a function of transmitting a tentative alcohol concentration ALC1 and a function of transmitting an alcohol concentration replacement command for performing replacement by the tentative alcohol concentration.

Figure 7:
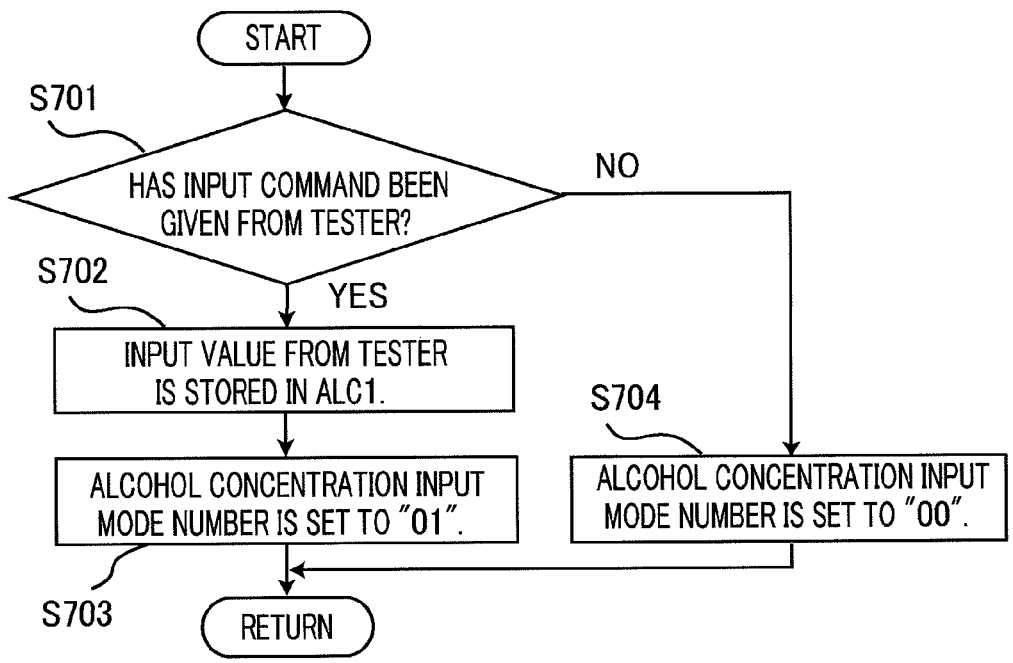
FIG. 7 is a flowchart representing a flow, according to Embodiment 2 of the present invention, in which an alcohol concentration input command from a tester is determined.

FIG. 7 is a routine for determining an alcohol replacement mode, based on whether or not a tester issues a command for replacement by a tentative alcohol concentration. The routine represented in FIG. 7 is recurrently carried out while ECU 12 operates, as is the case with the routine represented in FIG. 2. In the determination routine in FIG. 7, ECU 12 firstly determines in the step S701 whether or not the tester issues a command for replacement by a tentative alcohol concentration. In the case where it is determined that the tester does not issue a command for replacement by a tentative alcohol concentration, the alcohol concentration input mode is set to "00" in the step S704, and then the routine in FIG. 7 is ended.

In the case where, in the step S701, it is determined that the tester issues a command for replacement by a tentative alcohol concentration, the step S701 is followed by the step S702, where an alcohol concentration input value transmitted from the tester is stored as a tentative alcohol concentration ALC1; after that, the step 702 is followed by the step S703, where the alcohol concentration input mode is set to "01", and then the routine in FIG. 7 is ended.

In the routine in FIG. 7, determination of the alcohol concentration input mode is performed, and then it is determined whether or not the tentative replacement ALC1 of the concentration value is stored; after that, as is the case with Embodiment 1, the routines in FIGS. 3 and 4 are implemented.

In other words, F/B control interruption determination in FIG. 3 is performed, and it is determined whether or not the alcohol concentration value ALC2 estimated by means of F/B control and stored in ECU 12 through the routine in FIG. 4 is replaced by the alcohol concentration value ALC1 that is given from the outside, as a control-purpose concentration value, by the alcohol concentration input device 16; in the case where it is determined that the alcohol concentration value ALC2 is replaced by the alcohol concentration value ALC1, replacement by an appropriate alcohol concentration value can be performed, and in the case where it is determined that the alcohol concentration value ALC2 is not replaced by the alcohol concentration value ALC1, the alcohol concentration value, which is a value before the tentative replacement, can be restored.

As described above, according to Embodiment 2, by utilizing a vehicle diagnosis tester, as the alcohol concentration input device 16, it is not required to provide an adjustment knob in the instrument panel, and by connecting the vehicle diagnosis tester only when required, the alcohol concentration value can readily be inputted; therefore, an effect the same as that of Embodiment 1 can be demonstrated.

In addition, in Embodiment 2 described above, a vehicle diagnosis tester is utilized as the input device having a communication function; however, it is not required to limit the input device having a communication function to a vehicle diagnosis tester, as long as there exists another device that can demonstrate the same effect.

Moreover, there have been explained Embodiments 1 and 2 in which the rotation fluctuation amount ΔNe is utilized as a determination means for replacing the alcohol concentration value in the step S405; however, any determination means can be utilized as long as it enables determination on whether or not the engine is stably operated.

Various modifications and alterations of this invention will be apparent to those skilled in the art without departing from the scope and spirit of this invention, and it should be understood that this is not limited to the illustrative embodiments set forth herein.

What is claimed is:

1. A control apparatus for an internal combustion engine comprising:
   an alcohol concentration estimation means that estimates an alcohol concentration value ALC2 for the engine that utilizes an alcohol-containing fuel;
   a storage means that stores the alcohol concentration value ALC2 estimated by the alcohol concentration estimation means;
   an alcohol concentration feeding means that forcibly and tentatively changes an alcohol concentration value;
   a feedback interruption means that interrupts feedback control in engine control when the alcohol concentration feeding means forcibly and tentatively changes an alcohol concentration value;
   a determination means that determines whether or not to replace the estimated alcohol concentration value ALC2 stored in the storage means by the tentatively changed alcohol concentration value ALC1; and
   an update means that replaces the alcohol concentration value ALC2 stored in the storage means by the tentatively changed alcohol concentration value ALC1, when the determination means determines to implement the replacement.

2. The control apparatus for an internal combustion engine according to claim 1, wherein the alcohol concentration feeding means is formed of an external communication means.

3. The control apparatus for an internal combustion engine according to claim 2, wherein the communication means is a vehicle diagnosis tester having a communication function.

4. The control apparatus for an internal combustion engine according to claim 1, wherein the determination means is configured in such a way as to perform determination by detecting a rotation fluctuation amount of the engine.

5. The control apparatus for an internal combustion engine according to claim 1, further including a restoration means that restores the alcohol concentration value ALC2 estimated by the alcohol concentration estimation means to an immediately previous concentration value thereof that has not been replaced tentatively, when the determination means determines not to replace the alcohol concentration value ALC2 by the tentatively changed alcohol concentration value ALC1.

* * * * *